(12) United States Patent
Michel et al.

(10) Patent No.: US 9,098,658 B2
(45) Date of Patent: Aug. 4, 2015

(54) DISPLAY AND AUTOMATIC IMPROVEMENT OF TIMING AND AREA IN A NETWORK-ON-CHIP

(71) Applicant: QUALCOMM TECHNOLOGIES, INC., San Diego, CA (US)

(72) Inventors: Daniel Michel, Rungis (FR); Xavier Van Ruymbeke, Issy les Moulineaux (FR); Pascal Godet, Jouy en Josas (FR); Xavier Leloup, Santa Clara, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 0 days.

(21) Appl. No.: 13/898,540

(22) Filed: May 21, 2013

(65) Prior Publication Data

US 2013/0268903 A1     Oct. 10, 2013

Related U.S. Application Data

(62) Division of application No. 13/487,087, filed on Jun. 1, 2012, now Pat. No. 8,793,644.

(60) Provisional application No. 61/492,709, filed on Jun. 2, 2011.

(51) Int. Cl.
*G06F 17/50* (2006.01)

(52) U.S. Cl.
CPC ........ *G06F 17/5031* (2013.01); *G06F 2217/84* (2013.01)

(58) Field of Classification Search
USPC .......................................... 716/100–104, 139
See application file for complete search history.

(56) References Cited

U.S. PATENT DOCUMENTS

| 8,127,261 | B2 | 2/2012 | Auerbach et al. |
| 8,136,077 | B2 * | 3/2012 | McMurchie et al. .......... 716/129 |
| 2002/0152060 | A1 * | 10/2002 | Tseng .............................. 703/17 |
| 2003/0145288 | A1 * | 7/2003 | Wang et al. ....................... 716/2 |
| 2012/0311512 | A1 | 12/2012 | Michel et al. |

* cited by examiner

*Primary Examiner* — Binh Tat
(74) *Attorney, Agent, or Firm* — Muncy, Geissler, Olds & Lowe, P.C.

(57) ABSTRACT

A method and NoC design tool is disclosed that automatically maps the paths listed in a timing report and the unit size in an area report to the topology of a NoC and displays the paths and unit sizes in a GUI. The tool can also automatically add pipeline stages, separated by the maximum delay allowed in the timing budget, in order to achieve timing closure in an automated way.

14 Claims, 4 Drawing Sheets

DISPLAY AND AUTOMATIC IMPROVEMENT OF TIMING AND AREA IN A NETWORK-ON-CHIP

CROSS-REFERENCE TO RELATED APPLICATIONS

This application is a divisional of U.S. application Ser. No. 13/487,087, entitled "Display and automatic improvement of timing and area in a network-on-chip," filed Jun. 1, 2012, which claims priority to U.S. Provisional Patent Application No. 61/492,709, entitled "Display and automatic improvement of timing and area in a network-on-chip," filed on Jun. 2, 2011, the entire contents of each of which are incorporated herein by reference.

TECHNICAL FIELD

This disclosure generally relates to the design of network on chip (NoC) architectures.

BACKGROUND

The term "tool" is understood to encompass software used to aid in and automate the design of electronics. The term "start point" is understood to encompass flip-flops (flops) and input ports. The term "end point" is understood to encompass registers and output ports. A system-on-chip (SoC) comprises at least one network-on-chip (NoC). A NoC comprises a set of units the interconnection of which transports transactions between at least one master and at least one slave intellectual property core (IP). The IP cores themselves may be considered components of a NoC. A model of a NoC can be exported as a register transfer level (RTL) language description and in other representations such as SystemC or IP-XACT. Each instantiation of a unit has a configuration and each configuration of an instantiation of a unit has a model. The model can be exported from the tool as one or more RTL language modules, which are synthesized into a netlist of cells. Unit models comprise one or more component models, which in turn may comprise one or more component models and so on. Ultimately, each component model is composed entirely of elementary models such as individual gates and registers, connected by nets, one property of which is an estimated size.

State of the art NoC architectures are designed using a tool with a graphical user interface (GUI). The GUI shows units that comprise the NoC and allows the user to configure the connections between the units, cumulatively known as the topology of the NoC. The prior art configuration process 100 is shown in FIG. 1 and is as follows.

A user configures a NoC (102) using the NoC design tool. The NoC design tool exports a model of the NoC in a RTL language (104). The RTL language model describes the functionality and connectivity of the NoC units. The RTL model includes registers that consist of one or more flops. The RTL model is synthesized by a synthesis tool (106), which is different from a NoC design tool, into a netlist of cells. The synthesis tool reports the cell area of modules within the NoC RTL model. The synthesis tool also estimates the delay time for signal propagation along all logical paths between inputs and flops, between every two flops with a logical connection, and between flops and outputs, as well as fully combinatorial paths between inputs and outputs.

For a more accurate estimate of path delays in the final hardware implementation, place and route (P&R) tool takes the netlist and places each cell within a floorplan of the SoC silicon die connected by wires routed within the floorplan (108). A static timing analysis (STA) tool carefully calculates the delay time for signal propagation along all logical paths between inputs and flops, between every two flops with a logical connection, and between flops and outputs, as well as fully combinatorial paths between inputs and outputs (108).

Both the synthesis and static timing analysis tools produce a timing report showing the path delay through each cell in the netlist. The listed paths are typically sorted in order of the amount of delay, beginning with the longest. Paths with delay longer than a target clock period are known as critical paths. Critical paths prevent the SoC from operating correctly at the clock frequency corresponding to the target clock period. If there are no critical paths then the timing is met and the process is complete. If there are critical paths then the NoC topology is reconfigured (102) in the GUI and the process repeated.

In another case, the listed paths are sorted in order of the amount of delay, beginning with the shortest. Paths with delay shorter than a target hold time period are known as violating a hold time constraint. Paths that violate a hold time constraint prevent the SoC from operating correctly at any clock frequency and can only be corrected by adding logic delay such as combinatorial buffers. If there are no paths violating hold time constraints then the timing is met and the process is complete. If there are paths violating hold time constraints then the NoC topology is reconfigured in the GUI and the process repeated.

Pipelining

A reliable topology change to eliminate critical paths is the insertion of one or more flops within the paths that violate timing. This process is known as pipelining, and the inserted flops are known as pipe stages.

Synthesis and P&R tools create and remove logic cells to implement the functionality of logic between signals as described in the RTL model. It is practically difficult for those tools to preserve the names of signals from the RTL model. However, with most design methodologies the synthesis and P&R tools use exactly the number of flip-flop cells and inputs and output ports corresponding to the descriptions in the RTL model. Those cells and input and output ports preserve in the netlist and timing report the names that were given in the RTL model.

It is commonplace to flatten the hierarchy of RTL language modules in order to allow greater opportunity for optimization by the synthesis tool. Flattening frees the synthesis tool to lose more name information. That is acceptable below a certain level of hierarchy, as long as total flattening of the entire hierarchy is not performed. Generally, flattening to one or two levels below the top gives most benefits of synthesis optimization, preserving enough signal names for NoC analysis and debugging.

The NoC design tool that generates the RTL model does so by giving the registers and ports names that are descriptive of their position in the NoC topology. Based on the names of cells, and particularly the names of flip-flops, the designer uses the timing report to determine where in the topology the slow paths are. By doing so, the designer knows where in the topology to edit the NoC in order to improve the timing. The simplest and most reliable edit to improve timing without modification of the architecture of the NoC is to instantiate a pipeline stage unit at a location in the topology traversed by the critical path. The designer repeats the procedure of configuring the NoC, exporting RTL model, synthesizing, place and routing, and analyzing timing as needed to meet the specified target clock period.

In the prior art, the mapping of the paths listed in a timing report to the locations within a NoC topology is done manually by the designer. The process is tedious. Each path takes minutes or longer to find in the NoC topology. Critical paths are abbreviated by the designer by the insertion of pipeline stages. Every pipeline stage uses silicon area resources and adds latency to traffic in the NoC. To minimize the number of pipeline stage registers it is desirable to add pipeline stage registers before the last point in the path with the maximum delay allowed in the timing budget.

A first path, on which delay improvement is desirable, may partially overlap a second path. An optimal insertion of pipeline stage registers to break both timing paths might be at a location less than the unit immediately before the last point in the first path with the maximum delay allowed in the timing budget.

Area

Aside from path delay, area is a critical chip design constraint. Editing the topology, for example by adding pipe stages, affects the NoC area. Optimizing the topology often requires trade-offs between clock period and area. It is desirable to limit or at least observe the area of NoC units in order for the designer to control the trade-off between size, speed, and architectural performance.

SUMMARY

A method and NoC design tool is disclosed that automatically maps the paths listed in a timing report and the unit size in an area report to the topology of a NoC and displays the paths and unit sizes in a GUI. The tool can also automatically add pipeline stages, separated by the maximum delay allowed in the timing budget, in order to achieve timing closure in an automated way.

The disclosed implementations serve the purpose of easing the process of designing a NoC by automating several manually tedious aspects of the process.

DETAILED DESCRIPTION

Area

In one embodiment, the NoC design tool estimates the area of the logic of a NoC, in units of gates. The estimate is made by adding the estimated area of each configured instantiation of units within the NoC. The area of each configured instantiation is calculated by a recursive process of estimating the area of components down to elemental components such as elementary gates, multiplexors (muxes), demultiplexors (demuxes), and flip-flops.

The estimated gate area is then displayed in the GUI with each unit, with each group of units, and/or with each submodule of the NoC encompassing multiple units. The display of gate count numbers for each unit, group, or submodule can be enabled or disabled through settings in the GUI.

Figure 1:
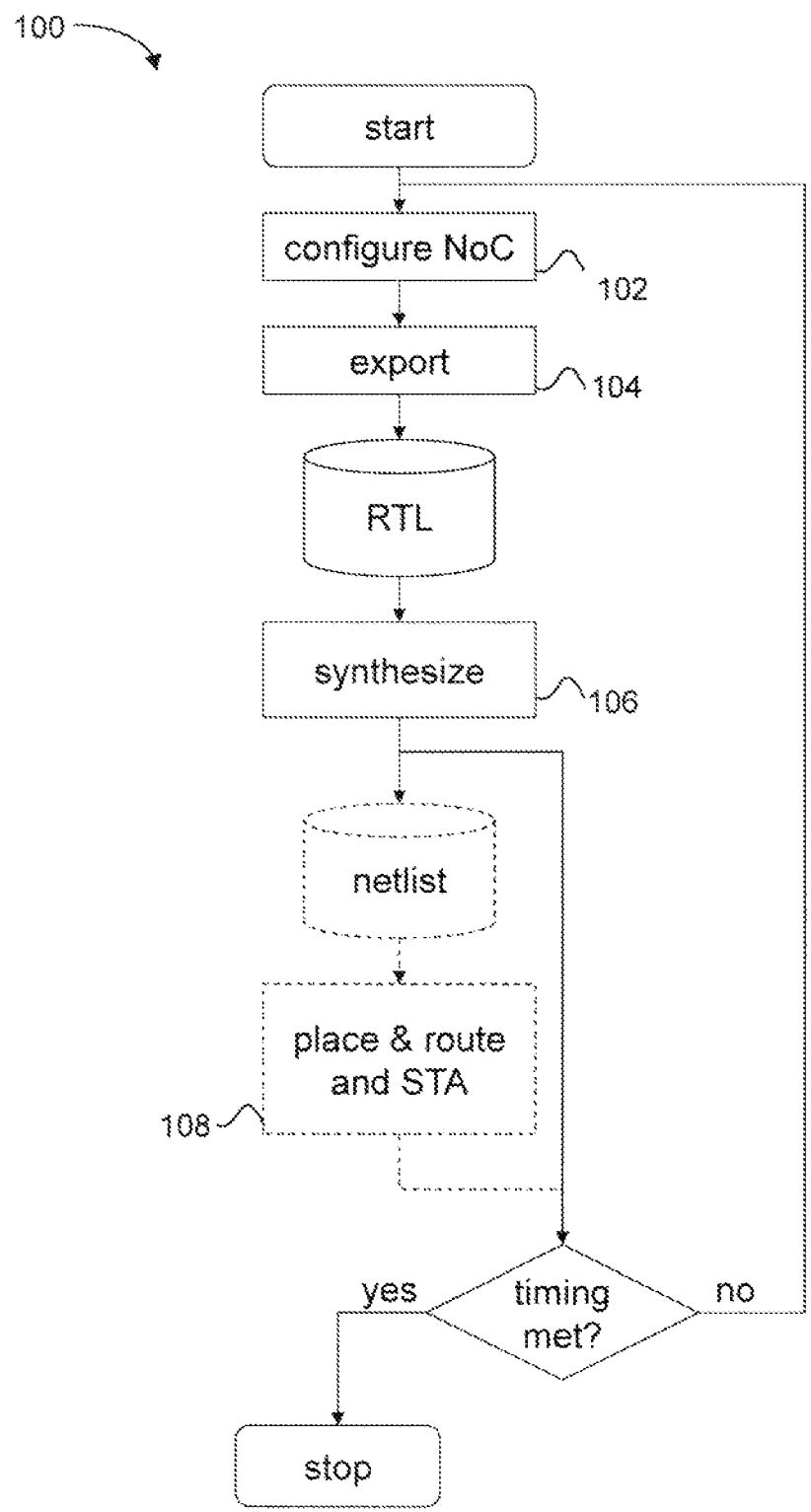
FIG. 1 is a flow diagram illustrating the prior art process of configuring a NoC.
Figure 2:
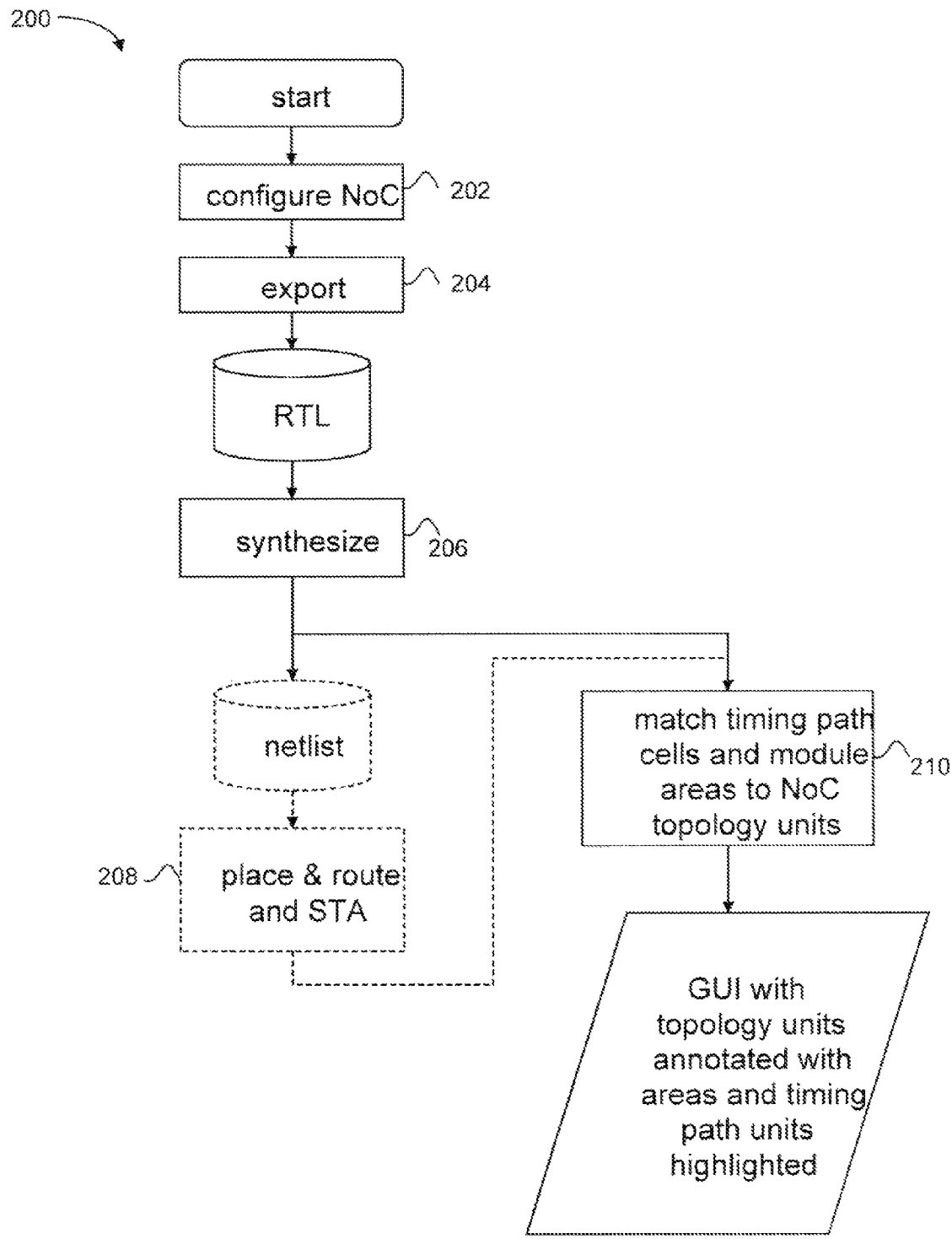
FIG. 2 is a flow diagram illustrating an example process of configuring a NoC followed by the automatic display of timing paths and units annotated by their area within the topology of a NoC.

In one embodiment, shown in FIG. 2, a user configures an NoC using a design tool (202). The NoC design tool exports an RTL model of the NoC (204). A synthesis tool synthesizes a netlist of standard cells from the RTL model (206). The synthesis tool also generates a report of the area of each standard cell and each RTL language module from the area of all standard cells of which it consists. It is important that the synthesis tool be configured and operated, generally through a tool command language (TCL) script, to preserve the names of signals (for example by not flattening the module hierarchy) of at least one level of module hierarchy. This will allow the NoC synthesis to perform a mapping of RTL language modules to instantiations of units in the NoC (210).

For a more accurate estimate of area in the final hardware implementation, a P&R tool takes the netlist and places each cell within a floorplan of the SoC silicon die connected by wires routed within the floorplan (208).

Next, the NoC design tool reads the RTL language module area information that is reported by the synthesis tool, and displays it as a table in the GUI, organized in a tree structure (210). The tree indicates the hierarchy of parent/child relationships among the modules of the NoC RTL model. Based on the names of the modules from the RTL model, the NoC design tool maps the areas of modules to the units that comprise the NoC (210). It further displays the area of units on a list of the units in the NoC. Another view within the GUI annotates a graphical display of sectors as described above.

Using the synthesis tool or P&R area estimate is more accurate than the gate count estimate made inside the NoC design tool. This is because the synthesis tool knows the actual size of each standard cell in the target library and makes optimizing choices of cells. The P&R tool is even more accurate because the P&R tool chooses the physical placement of cells within the floorplan of the chip. The P&R tool might or might not choose to leave space between cells depending on design rule constraints such as those related to wire density and timing constraints.

Whereas one embodiment of a NoC design tools may be restricted solely to the transport of transactions between industry standard interfaces, another embodiment encompasses a broader view of the SoC. In that embodiment the IPs that comprise the SoC are included in the description and their size is reported in a graphical view of the NoC.

Timing

A synthesis tool also reports the timing of paths in the NoC. Often this is done with paths sorted from the longest. The timing report gives a list of cells in the path, the delay through each cell, and the cumulative delay at each cell in the path. A synthesis tool makes the report based solely on a delay model of each cell or that combined with a tabular model (wire load model) of delay for wires between cells. A place & route tool determines the physical placement of cells and the geometry of wires between them. It determines not only the cell delay but also information about the wiring connectivity between the cells. That includes information about the length, width, and thickness of wires and the location of vias between the metal layers of the chip in order to extract accurate parasitic elements, which can be back annotated on the gate description for a better timing analysis. A static timing analysis tool, run on the P&R output, can thereby make a more accurate estimate of timing.

Figure 3:
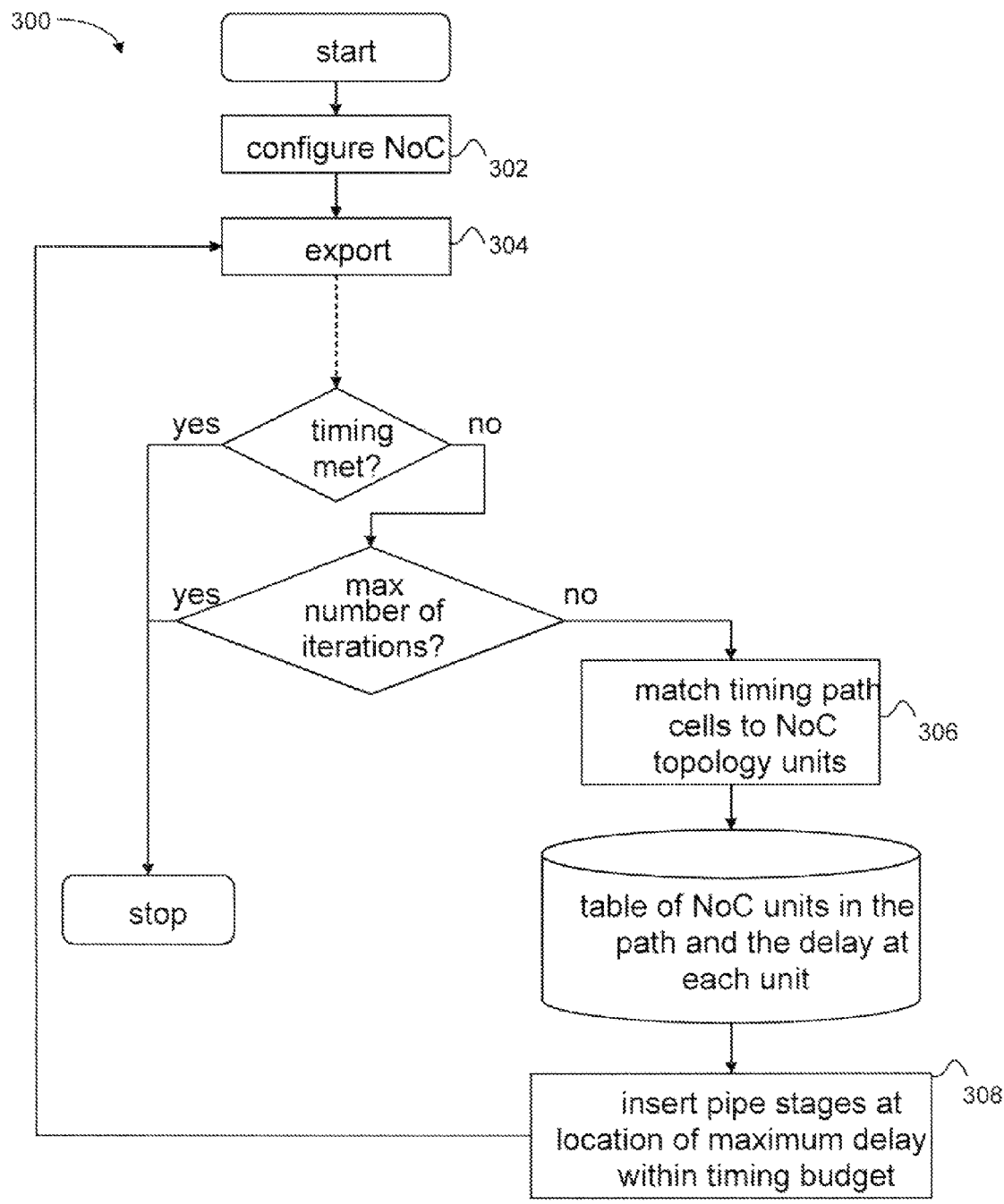
FIG. 3 is a flow diagram illustrating an example process of automatic pipeline stage insertion.

In another embodiment of the invention, also represented by FIG. 3, the NoC is initially configured (202). Next, the NoC design tool exports an RTL model of the NoC (204). A synthesis tool synthesized the a netlist of standard cells from the RTL model (206). The synthesis tool also generates a report of the timing paths in the design. It is important that the synthesis tool be configured and operated, generally through a TCL script, to preserve the names of signals (for example by not flattening the module hierarchy) of at least one level of RTL language module hierarchy. This will allow the NoC synthesis to perform a mapping of RTL language modules to instantiations of units in the NoC (210).

For a more accurate estimate of path delays in the final hardware implementation, a P&R tool takes the netlist and places each cell within a floorplan of the SoC silicon die connected by wires routed within the floorplan (208). A STA tool carefully calculates the delay time for signal propagation along all logical paths between inputs and flops, between every two flops with a logical connection, and between flops and outputs, as well as fully combinatorial paths between inputs and outputs (208).

Next, the NoC design tool reads the path timing information that is reported by the synthesis tool or by the STA tools. For a chosen timing path, the tool maps the start point to a unit in the NoC (210). The tool proceeds to map the names of intermediate signals in the timing path and the end point to units within the NoC. The units are highlighted in the GUI. The highlighting indicates, using lines with arrows, the order of units traversed by signals in the timing path. Timing path reports also indicate, among other information, the target delay constraint, which is also known as the timing budget. The NoC design tool displays the lines in the GUI with colors. The line(s), if any, indicating the path between units where the cumulative time in the path is before the expiration of the timing budget are black. The line(s), if any, after the timing budget expires are red.

Figure 4:
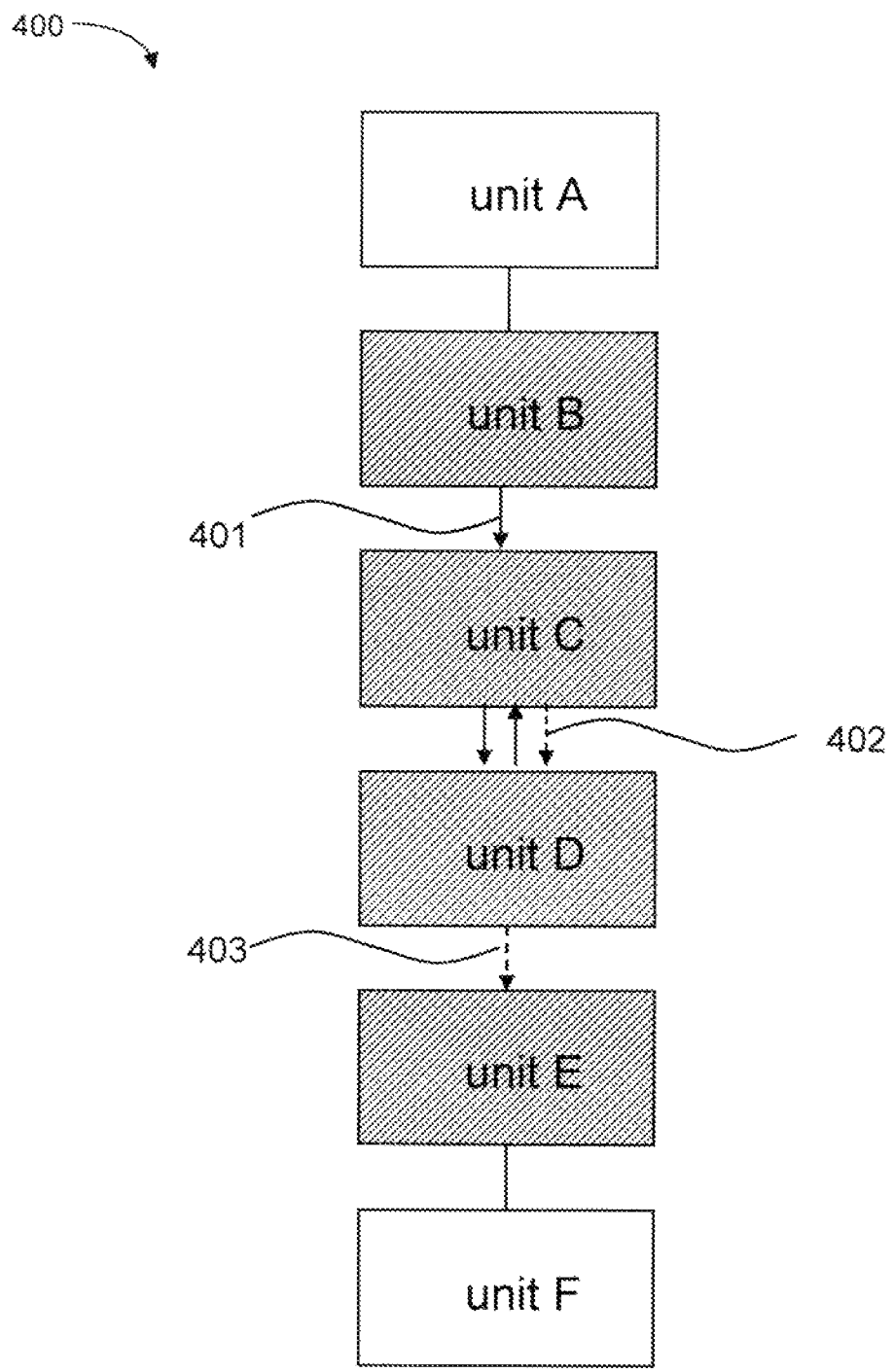
FIG. 4 illustrates the display of units in a GUI of the design tool highlighting the critical path.

FIG. 4 shows an example of display in the GUI. In the example, the start point of the path is in unit B and the end point is in unit E. Units B, C, D, and E are highlighted to indicate that at least one part of the timing path exists in those units. Arrow 401 is black. It indicates a segment of the timing path. The timing path traverses logic in units C and D with the successive segments of the path passing from unit C to D, D to C, and C to D again. The timing budget expires in the final traversal of unit C and so arrows 402 and 403 are displayed in red (indicated in FIG. 4 as a dashed line). No part of the timing path is in units A or F. As a result of the display, the user knows in which segment of the path to add a pipe stage in order to fix a timing violation, and in which unit that segment exists. In other embodiments, the connections can be visually augmented in other ways, including but not limited to different line styles or fill patterns, animation, glowing or other contrasting effects, shadowing or any other visual indications.

Automatic Pipeline Stage Insertion

A synthesis run can generate a result with many thousands or more of timing paths that violate their timing budgets. Despite the convenience of seeing the timing paths in the GUI, the process of inserting pipeline stages at optimal locations in the NoC topology is a tedious manual procedural process. Another embodiment, shown in FIG. 3, saves time in the process of designing a NoC by automating the insertion of pipeline stages.

A user configures an NoC using a design tool (302). The NoC design tool exports an RTL model of the NoC (304). A synthesis tool synthesizes a netlist of standard cells from the RTL model. The synthesis tool also generates a report of the timing paths in the design in a manner that preserves the names of signals (by not flattening the module hierarchy) of at least one level of RTL language module hierarchy. Optionally, P&R and STA are run and a timing report is generated. The process of synthesis and P&R and STA is the same in FIG. 3 and in FIG. 2, but abbreviated by a dashed line.

From the synthesis or STA timing report the NoC design tool reads the path timing information for the slowest path. Beginning at the start point of the path the NoC design tool maps successive signal of the path to instantiations of units in the NoC. It does so until reaching a signal that is beyond the timing budget If the NoC design tool reaches the endpoint of the slowest path without finding a path segment beyond the timing budget then the design has achieved timing closure and the NoC design tool finishes the process by reporting success. If the NoC design tool finds a segment of the timing path for which the cumulative delay of all previous logic in the path is greater than the timing budget then the NoC design tool inserts a pipe stage unit between the previous unit that had no timing violation and the unit of the logic with that first exceeds the timing budget (308).

For a configurable number of timing paths, as few as one (the case shown in FIG. 3) or as many as is practical, the NoC design tool chooses a next slowest path and repeats the procedure of inserting a pipe stage (308). However, the NoC design tool saves a table of the locations in the topology in which it has previously added pipe stages. If a segment of a path before the expiration of the timing budget crosses between units in between which the NoC design tool had previously inserted a pipe stage then the path is ignored. If a timing path is encountered, the end point of which does not exceed the timing budget, then the procedure is ended.

At the end of the procedure of inserting pipe stages on long timing paths the NoC design tool proceeds to export an RTL model and run synthesis again. For brevity, FIG. 3 indicates the process of running synthesis or synthesis and P&R with a dashed line. The NoC design tool counts the number of iterations as it repeats the full iterative loop. If a maximum number of iterations is reached without reaching successful timing closure then the NoC design tool ends the process by reporting failure.

The disclosed embodiments are distinct in several important ways from conventional methods. With the disclosed embodiments, register retiming is constrained to preserve the functionality, in terms of cycles of pipeline latency, between iterations of the transformation process. The disclosed embodiments takes advantage of the fact that a NoC is modular and has no backwards dependencies between modules. As a result, the registers of pipeline stages can be added. This allows timing closure more easily, though at the expense of greater pipeline latency. Furthermore, a pipeline stage is more than just a register. Pipe stage units in a NoC necessarily include logic to implement flow control. Another important distinction is that a NoC design tool inserts pipeline stages at the architecture level. As a result, all models of the NoC derived and exported by the NoC design tool include the functionality of the pipe stage. This might include SystemC, Verilog, VHDL, latency reports, and other descriptions of the NoC or its behavior.

The design tool can be implemented in firmware, software, or in combinations of them. The design tool can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of automatically improving timing of a network on chip (NoC), comprising:
    exporting a register transfer language (RTL) model of the NoC;
    synthesizing the model to preserve an identity of signals;
    determining, using a processor, a slowest path in the NoC;
    mapping a signal at the start of the slowest path to a first unit of the NoC;
    mapping a sequentially next subset of the slowest path to a corresponding unit, for a number of times equal to or greater than one; and
    inserting, if the subset of the slowest path is the first to exceed a target time, a pipe stage before the unit to which the subset of the slowest path is mapped.

2. The method of claim 1, further comprising:
    placing and routing the model in a manner that preserves the identity of signals.

3. The method of claim 1, wherein a pipe stage comprises a logic circuit other than a flip-flop.

4. The method of claim 1, wherein the inserted pipe stage is implemented in an architecture description of the NoC whereby the presence of the inserted pipe stage is reflected in at least one model derived from an architecture other than the synthesized RTL model.

5. The method of claim 1, further comprising:
    inserting, if the subset of the slowest path is the first to exceed a second target time beyond the previously inserted pipe stage, a pipe stage before the unit to which the subset of the slowest path is mapped.

6. The method of claim 1, further comprising:
    checking to determine if the target time is met.

7. The method of claim 1, further comprising:
    checking to determine if a maximum number of iterations is met.

8. A method of automatically improving the timing of a network of chip (NoC), comprising:

exporting an register transfer language (RTL) model of the NoC;
synthesizing the model to preserve an identity of signals;
determining, using a processor, a path;
mapping a signal at the start of the path to a first unit of the NoC;
mapping a sequentially next subset of the path to a corresponding unit, for a number of times equal to or greater than one; and
inserting, if the subset of the path is the first to exceed a target time beyond a previously inserted pipe stage, a pipe stage before the unit to which the subset of the path is mapped.

9. A non-transitory computer-readable medium, comprising processor-executable instructions stored thereon that are configured to cause the processor to execute a method of automatically improving timing of a network on chip (NoC), comprising:
exporting a register transfer language (RTL) model of the NoC;
synthesizing the model to preserve an identity of signals;
determining, using a processor, a slowest path in the NoC;
mapping a signal at the start of the slowest path to a first unit of the NoC;
mapping a sequentially next subset of the slowest path to a corresponding unit, for a number of times equal to or greater than one; and
inserting, if the subset of the slowest path is the first to exceed a target time, a pipe stage before the unit to which the subset of the slowest path is mapped.

10. A non-transitory computer-readable medium, comprising processor-executable instructions stored thereon that are configured to cause the processor to execute a method of automatically improving the timing of a network of chip (NoC), comprising:
exporting an register transfer language (RTL) model of the NoC;
synthesizing the model to preserve an identity of signals;
determining, using a processor, a path;
mapping a signal at the start of the path to a first unit of the NoC;
mapping a sequentially next subset of the path to a corresponding unit, for a number of times equal to or greater than one; and
inserting, if the subset of the path is the first to exceed a target time beyond a previously inserted pipe stage, a pipe stage before the unit to which the subset of the path is mapped.

11. An apparatus configured to automatically improve timing of a network on chip (NoC), comprising:
means for exporting a register transfer language (RTL) model of the NoC;
means for synthesizing the model to preserve an identity of signals;
means for determining, using a processor, a slowest path in the NoC;
means for mapping a signal at the start of the slowest path to a first unit of the NoC;
means for mapping a sequentially next subset of the slowest path to a corresponding unit, for a number of times equal to or greater than one; and
means for inserting, if the subset of the slowest path is the first to exceed a target time, a pipe stage before the unit to which the subset of the slowest path is mapped.

12. An apparatus configured to automatically improve timing of a network on chip (NoC), comprising:
means for exporting an register transfer language (RTL) model of the NoC;
means for synthesizing the model to preserve an identity of signals;
means for determining, using a processor, a path;
means for mapping a signal at the start of the path to a first unit of the NoC;
means for mapping a sequentially next subset of the path to a corresponding unit, for a number of times equal to or greater than one; and
means for inserting, if the subset of the path is the first to exceed a target time beyond a previously inserted pipe stage, a pipe stage before the unit to which the subset of the path is mapped.

13. An apparatus configured to automatically improve timing of a network on chip (NoC), comprising:
a processor; and
a memory coupled to the processor and storing processor-executable instructions that are configured to cause the processor to execute a method of automatically improving timing of a network on chip (NoC) that includes:
exporting a register transfer language (RTL) model of the NoC;
synthesizing the model to preserve an identity of signals;
determining, using a processor, a slowest path in the NoC;
mapping a signal at the start of the slowest path to a first unit of the NoC;
mapping a sequentially next subset of the slowest path to a corresponding unit, for a number of times equal to or greater than one; and
inserting, if the subset of the slowest path is the first to exceed a target time, a pipe stage before the unit to which the subset of the slowest path is mapped.

14. An apparatus configured to automatically improve timing of a network on chip (NoC), comprising:
a processor; and
a memory coupled to the processor and storing processor-executable instructions that are configured to cause the processor to execute a method of automatically improving timing of a network on chip (NoC) that includes:
exporting an register transfer language (RTL) model of the NoC;
synthesizing the model to preserve an identity of signals;
determining, using a processor, a path;
mapping a signal at the start of the path to a first unit of the NoC;
mapping a sequentially next subset of the path to a corresponding unit, for a number of times equal to or greater than one; and
inserting, if the subset of the path is the first to exceed a target time beyond a previously inserted pipe stage, a pipe stage before the unit to which the subset of the path is mapped.

* * * * *